US008827805B1

(12) United States Patent
Caporusso et al.

(10) Patent No.: US 8,827,805 B1
(45) Date of Patent: Sep. 9, 2014

(54) BALANCING COMMUNITY GAMING EFFECTS

(75) Inventors: Vito M. Caporusso, Downers Grove, IL (US); Howard R. Pfeifer, Chicago, IL (US); Eric M. Pryzby, Skokie, IL (US); Paul J. Radek, Naperville, IL (US); Steven J. Zoloto, Highland Park, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/204,225

(22) Filed: Aug. 5, 2011

Related U.S. Application Data

(60) Provisional application No. 61/371,272, filed on Aug. 6, 2010.

(51) Int. Cl.
*A63F 13/00* (2014.01)

(52) U.S. Cl.
USPC .................... 463/35; 463/25; 463/29; 463/30

(58) Field of Classification Search
USPC .......................................... 463/25, 29, 30, 35
See application file for complete search history.

(56) References Cited

U.S. PATENT DOCUMENTS 5,483,631 A 1/1996 Nagai et al.
5,633,933 A 5/1997 Aziz
6,040,831 A 3/2000 Nishida
6,081,266 A 6/2000 Sciammarella
6,146,273 A 11/2000 Olsen
6,217,448 B1 4/2001 Olsen
6,647,119 B1 11/2003 Slezak
6,843,723 B2 1/2005 Joshi
6,939,226 B1 9/2005 Joshi
6,960,136 B2 11/2005 Joshi et al.
6,972,528 B2 12/2005 Shao
6,974,385 B2 12/2005 Joshi et al.
6,991,543 B2 1/2006 Joshi (Continued)

FOREIGN PATENT DOCUMENTS

EP 1439507 7/2004
WO WO2004086320 10/2001

(Continued)

OTHER PUBLICATIONS

U.S. Appl. No. 12/797,756, filed Jun. 10, 2010, Berry, Robert G., et al.

(Continued)

*Primary Examiner* — Dmitry Suhol
*Assistant Examiner* — Shahid Kamal
(74) *Attorney, Agent, or Firm* — DeLizio Gilliam, PLLC

(57) ABSTRACT

Operations for a wagering game system include detecting that presentation devices (e.g., speakers, lights, etc.) associated with a group of wagering game machines, are scheduled to simultaneously present a community wagering game event that includes a gaming effect (e.g., sound, light, vibrations, etc.). The operations can further include determining, based on a characteristic associated with the presentation of the gaming effect that the gaming effect, if played simultaneously on the presentation devices associated with the plurality of the wagering game machines, would provide an amplified presentation of the gaming effect that would exceed a threshold presentation level that may cause discomfort to a casino patron. The operations can further include modifying a presentation setting or property so that a presentation of the gaming effect remains below the threshold presentation level.

19 Claims, 6 Drawing Sheets

(56) References Cited

U.S. PATENT DOCUMENTS 6,997,803 B2 * 2/2006 LeMay et al. .................. 463/20
7,082,572 B2 7/2006 Pea et al.
7,112,139 B2 9/2006 Paz Barahona et al.
7,228,190 B2 6/2007 Dowling et al.
7,364,508 B2 4/2008 Loose et al.
7,367,886 B2 5/2008 Loose et al.
7,449,839 B1 11/2008 Chen
7,479,063 B2 1/2009 Pryzby et al.
7,666,091 B2 2/2010 Joshi et al.
7,682,249 B2 3/2010 Winans et al.
7,811,170 B2 10/2010 Winans et al.
8,083,587 B2 * 12/2011 Okada ............................ 463/30
8,613,667 B2 12/2013 Brunell et al.
8,622,830 B2 1/2014 Radek
2001/0021666 A1 * 9/2001 Yoshida et al. ................ 463/20
2002/0010018 A1 1/2002 Lemay et al.
2002/0055978 A1 5/2002 Joon-Bo et al.
2002/0160826 A1 10/2002 Gomez et al.
2003/0007648 A1 1/2003 Currell
2003/0017865 A1 1/2003 Beaulieu et al.
2003/0130033 A1 7/2003 Loose
2003/0132722 A1 7/2003 Chansky et al.
2004/0072610 A1 4/2004 White et al.
2004/0142747 A1 * 7/2004 Pryzby ........................... 463/35
2004/0160199 A1 8/2004 Morgan et al.
2005/0043090 A1 2/2005 Pryzby et al.
2005/0054440 A1 3/2005 Anderson et al.
2005/0077843 A1 4/2005 Benditt
2005/0116667 A1 6/2005 Mueller et al.
2005/0128751 A1 6/2005 Roberge et al.
2005/0164785 A1 7/2005 Connelly
2005/0164786 A1 7/2005 Connelly
2005/0164787 A1 7/2005 Connelly
2005/0164788 A1 7/2005 Grabiec
2005/0174473 A1 8/2005 Morgan et al.
2005/0239545 A1 10/2005 Rowe
2005/0248299 A1 11/2005 Chemel et al.
2005/0275626 A1 12/2005 Mueller et al.
2005/0277469 A1 12/2005 Pryzby et al.
2005/0282631 A1 12/2005 Bonney et al.
2006/0009285 A1 1/2006 Pryzby et al.
2006/0022214 A1 2/2006 Morgan et al.
2006/0046829 A1 3/2006 White
2006/0076908 A1 4/2006 Morgan et al.
2006/0253781 A1 11/2006 Pea et al.
2007/0008711 A1 1/2007 Kim
2007/0036368 A1 2/2007 Hettinger et al.
2007/0111776 A1 5/2007 Griswold et al.
2007/0189026 A1 8/2007 Chemel et al.
2007/0218970 A1 9/2007 Patel et al.
2007/0218974 A1 9/2007 Patel et al.
2007/0291483 A1 12/2007 Lys
2007/0293304 A1 12/2007 Loose et al.
2008/0039213 A1 2/2008 Cornell et al.
2008/0070685 A1 3/2008 Pryzby et al.
2008/0094005 A1 4/2008 Rabiner et al.
2008/0113715 A1 5/2008 Beadell et al.
2008/0113796 A1 5/2008 Beadell et al.
2008/0113821 A1 5/2008 Beadell et al.
2008/0161108 A1 7/2008 Dahl et al.
2008/0176647 A1 7/2008 Acres
2008/0231203 A1 9/2008 Budde et al.
2008/0278946 A1 11/2008 Tarter et al.
2008/0288607 A1 11/2008 Muchow
2008/0309259 A1 12/2008 Snijder et al.
2009/0009997 A1 1/2009 Sanfilippo et al.
2009/0023485 A1 1/2009 Ishihata et al.
2009/0170597 A1 7/2009 Bone et al.
2009/0197673 A1 8/2009 Bone et al.
2009/0203427 A1 * 8/2009 Okada ............................ 463/20
2009/0206773 A1 8/2009 Chang
2009/0270167 A1 10/2009 Ajiro et al.
2009/0298579 A1 12/2009 Radek et al.
2009/0318223 A1 12/2009 Langridge et al.
2010/0022298 A1 1/2010 Kukita
2010/0022305 A1 * 1/2010 Yano .............................. 463/35
2010/0029385 A1 2/2010 Garvey et al.
2010/0031186 A1 2/2010 Tseng et al.
2010/0075750 A1 3/2010 Bleich et al.
2010/0113136 A1 5/2010 Joshi et al.
2010/0171145 A1 7/2010 Morgan et al.
2010/0213876 A1 8/2010 Adamson et al.
2010/0234107 A1 * 9/2010 Fujimoto et al. ................ 463/35
2010/0277079 A1 11/2010 Van Der Veen et al.
2010/0309016 A1 12/2010 Wendt et al.
2010/0317437 A1 12/2010 Berry et al.
2011/0035404 A1 2/2011 Morgan et al.
2011/0045905 A1 2/2011 Radek
2011/0050101 A1 3/2011 Bailey et al.
2011/0118018 A1 * 5/2011 Toyoda ........................... 463/31
2011/0190052 A1 * 8/2011 Takeda et al. .................. 463/31
2012/0009995 A1 * 1/2012 Osgood .......................... 463/35
2012/0040738 A1 * 2/2012 Lanning et al. ................. 463/20
2012/0115608 A1 * 5/2012 Pfeifer et al. .................. 463/35
2012/0129601 A1 5/2012 Gronkowski et al.
2012/0178523 A1 7/2012 Greenberg et al.
2012/0178528 A1 7/2012 Brunell et al.
2013/0184078 A1 7/2013 Brunell et al.
2013/0310178 A1 11/2013 Pryzby et al.

FOREIGN PATENT DOCUMENTS

WO WO2004014501 2/2004
WO WO2004075128 9/2004
WO WO2004075129 9/2004
WO WO2005113089 12/2005
WO WO2005114598 12/2005
WO WO2005114599 12/2005
WO WO2005117647 12/2005
WO WO2006017444 2/2006
WO WO2006017445 2/2006
WO WO2006033941 3/2006
WO WO2006039284 4/2006
WO WO2006039323 4/2006
WO WO2006125013 11/2006
WO WO2007022294 2/2007
WO WO2007022343 2/2007
WO WO2007061904 5/2007
WO WO2007133566 11/2007
WO WO2008057538 5/2008
WO WO2008063391 5/2008
WO WO2008137130 11/2008
WO WO2009054930 4/2009
WO WO2010048068 4/2010
WO WO-2011005797 1/2011
WO WO2011005798 1/2011
WO WO2011014760 2/2011
ZA 20041110 8/2005

OTHER PUBLICATIONS

U.S. Appl. No. 12/860,467, filed Aug. 20, 2010, Radek, Paul J.
U.S. Appl. No. 12/965,749, filed Dec. 10, 2010, Brunell, Edward G., et al.
U.S. Appl. No. 12/971,544, filed Dec. 17, 2010, Brunell, Edward G., et al.
U.S. Appl. No. 13/094,701, filed Apr. 26, 2011, Brunell, Edward G., et al.
U.S. Appl. No. 13/094,811, filed Apr. 26, 2011, Brunell, Edward G., et al.
U.S. Appl. No. 13/109,427, filed May 17, 2011, Brunell, Ed et al.
U.S. Appl. No. 13/094,560, filed Apr. 26, 2011, Brunell, Edward G., et al.
"PCT Application No. PCT/US10/41112 International Search Report", Sep. 2, 2010 , 11 pages.
"PCT Application No. PCT/US10/43886 International Search Report", Sep. 16, 2010 , 12 pages.
"PCT Application No. PCT/US10/41111 International Preliminary Report on Patentability", Oct. 24, 2011 , 13 pages.
"PCT Application No. PCT/US10/41111 International Search Report", Sep. 1, 2010 , 12 pages.
"PCT Application No. PCT/US10/41112 International Preliminary Report on Patentability", Aug. 31, 2012 , 4 pages.

(56) References Cited

OTHER PUBLICATIONS

"PCT Application No. PCT/US10/43886 International Preliminary Report on Patentability", May 3, 2012 , 4 pages.
"U.S. Appl. No. 12/860,467 Office Action", Jan. 17, 2013 , 16 pages.
"U.S. Appl. No. 12/965,749 Final Office Action", Apr. 22, 2013 , 30 Pages.
"U.S. Appl. No. 12/965,749 Office Action", Nov. 8, 2012 , 30 pages.
"U.S. Appl. No. 12/971,544 Final Office Action", Mar. 14, 2013, 38 pages.
"U.S. Appl. No. 12/971,544 Office Action", Nov. 6, 2012 , 43 pages.
"U.S. Appl. No. 13/094,560 Office Action", Mar. 30, 2012 , 13 pages.
"U.S. Appl. No. 13/094,701 Final Office Action", Nov. 28, 2012 , 14 pages.
"U.S. Appl. No. 13/094,701 Office Action", Mar. 27, 2012 , 26 pages.
"U.S. Appl. No. 13/094,811 Office Action", Apr. 3, 2012 , 16 pages.
"U.S. Appl. No. 13/382,738 Office Action", Feb. 7, 2013 , 41 pages.
"U.S. Appl. No. 13/382,783 Office Action", Feb. 28, 2012 , 26 pages.
"U.S. Appl. No. 13/382,783 Office Action", Jul. 25, 2013 , 20 Pages.
Gusella, Riccardo et al., "An Election Algorithm for a Distributed Clock Synchronization Program", *Berkley* http://www.eecs.berkeley.edu/Pubs/TechRpts/1986/CSD-86-275.pdf Dec. 1985, 19 pages.
"U.S. Appl. No. 12/797,756 Office Action", Nov. 7, 2013 , 7 Pages.
"U.S. Appl. No. 12/965,749 Office Action", Dec. 17, 2013 , 35 Pages.
"U.S. Appl. No. 13/382,783 Final Office Action", Oct. 4, 2013 , 22 Pages.

* cited by examiner

| ACCOUNT | MACHINE | EVENT ELIGIBLE? |
|---|---|---|
| M. MILLER | 160 | YES |
| J. SAIZ | 161 | YES |
| A. JONES | 162 | YES |
| F. AZIZ | 163 | YES |

BALANCING COMMUNITY GAMING EFFECTS

RELATED APPLICATIONS

This application claims the priority benefit of U.S. Provisional Application No. 61/371,272 filed Aug. 6, 2010.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

TECHNICAL FIELD

Embodiments of the inventive subject matter relate generally to wagering game systems and networks that, more particularly, managing community wagering game effects in grouped wagering game machines.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Music and other sounds (i.e., soundtracks) played in wagering games help to immerse a wagering game player ("player") into a wagering game experience and add to the excitement and fun of wagering games. Soundtracks sometimes will rise in volume levels to generate a sense of anticipation in a player. The rise in volume is sometimes referred to as a "build-up" because of the build-up of anticipation it invokes in a player. The soundtrack for a wagering game is prepared and stored on a wagering game machine or on a wagering game server well before the wagering game machine is placed on the casino floor. Audio engineers that program soundtracks for a wagering game, balance and mix the sound track in a test environment to produce optimal sound for one player seated at one wagering game machine. If the audio engineer balances the soundtrack to be too quiet or too loud for the player, then the player who plays the wagering game in the casino would become irritated or would not experience the full benefit of the game and would not feel immersed in the gaming experience. When the audio engineers prepare the soundtracks, the wagering game manufacturer stores the sound files on a wagering game machine or a server, and the wagering game manufacturer provides the wagering game machines and/or servers to a casino.

After the casino receives the wagering game machines, the wagering game manufacturer has no control over where the wagering game machines are placed in the casino. The casino will often place wagering game machines together in a group, or bank, for several reasons, such as to make a specific theme of games easier to find and also so that players playing the same game can feel a sense of camaraderie when seated next to each other. Sometimes group games, or community wagering games, for which multiple players are eligible to participate, may play a sound effect at each of the wagering game machines in a bank at the same time. The placement of the wagering game machines in a bank, however, can cause the simultaneous presentation of the same sound effect to amplify and produce an uncomfortable sound level or conflict with presentation of other sound effects.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Recently, community wagering games have become a popular type of game in casinos. Some community wagering games provide a gaming environment where a group of players can play the same wagering game in a competitive or collaborative setting. Sometimes community wagering games simultaneously present a community event, like a presentation of, or anticipatory announcement for, a jackpot or other type of "big win" event. The community event presents a gaming effect, such as a sound effect, on each of the wagering game machines at which the players are situated. However, when wagering game machines are situated next to each other in a bank, and when each is playing a community sound track during a community event, audio levels from each individual machine will magnify the same sound produced by a neighboring machine, causing the combined sound volume level to become too loud. The increased sound level creates discomfort to the ears of players seated at the bank. Build-ups, explosions, or other types of sounds that generate the highest sound levels in a soundtrack can especially create uncomfortable sound volume levels at a bank when multiple neighboring wagering game machines play the same sound at the same time.

Figure 1:
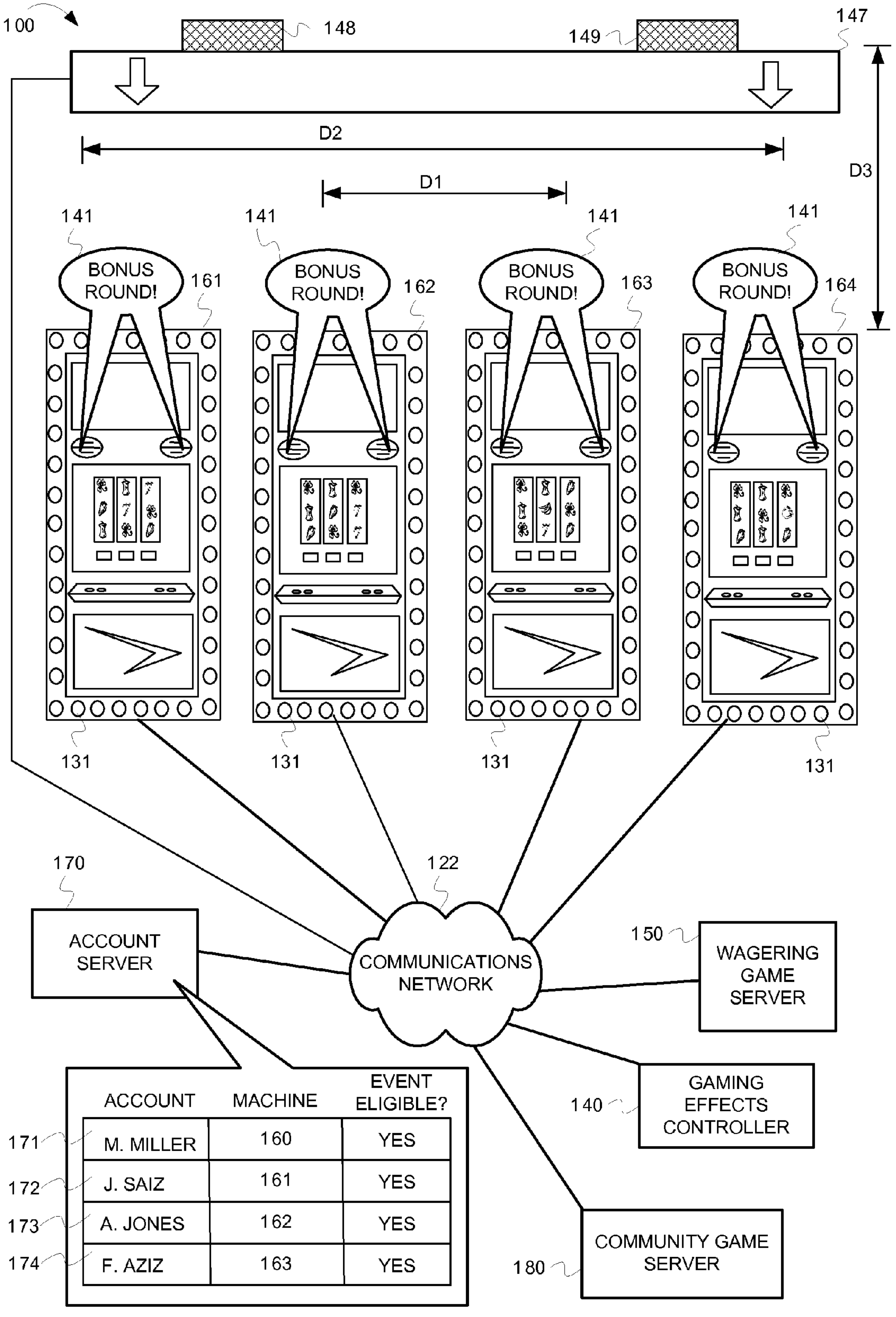
FIG. 1 is an illustration of balancing gaming effects in a wagering game machine bank, according to some embodiments.

FIG. 1 is a conceptual diagram that illustrates an example of balancing gaming effects in a wagering game machine bank, according to some embodiments. In FIG. 1, a wagering game system ("system") 100 includes wagering game machines 161, 162, 163, and 164 ("161-164") situated in a casino in a group (i.e., are grouped in close proximity to each other, are adjacent, etc.). Groups of wagering game machines are sometimes referred to as banks. The wagering game machines 161-164 are connected to a communications network 122. A wagering game server 150, a community game server 180, and a gaming effects controller 140 are also connected to the communications network 122. Also included in the system 100 is an account server 170. The account server 170 host can host multiple wagering game accounts (e.g., player account 171 for the user "M. Miller," player account 172 for the user "J. Saiz," player account 173 for the user "A. Jones," and player account 174 for the user "F. Aziz"). The players log in to the player accounts 171, 172, 173, and 174 ("171-174") using the wagering game machines 161-164 (e.g., players use player tracking cards to login to the player accounts 171-174 using magnetic card readers or radio frequency readers at the wagering game machines 161-164). The wagering game machines 161-164 and/or the wagering game server 150 can provide some gaming content (e.g., a slot game that includes reels, payline meters, bet meters, credit meters, reel control buttons, etc.) during wagering game sessions. Players can play primary wagering games during the wagering game sessions on each of the wagering game machines 161-164 using the player accounts 171-174. The wagering game server 150 and/or the account server 170 interact during the wagering game sessions to transfer bets or wagers between any of the player accounts 171-174 and a casino account. The community gaming server 180 can, at some point during the wagering game sessions, present a community gaming event for any of the player accounts 171-174 that may be eligible to participate in and/or receive a presentation of the community gaming event. For instance, during the wagering game sessions, any of the players can contribute a portion of bets to be eligible for a community jackpot or a community bonus game. The account server 170 can track which of the player accounts 171-174 are eligible. For example, the player accounts 171-174 may have performed activities during primary wagering game play, or been selected for other reasons to participate in the community event, which the account server 170 tracks. The player accounts 171-174 are associated with players at wagering game machines 161-164. Consequently, the wagering game machines 161-164 may be referred to as eligible wagering games machines, or in other words, wagering game machines that are selected to present content for the community event. The community game server 180 provides content for the community event ("community event content"). Part of the content may include a sound or lighting effect that is scheduled to play on the wagering game machines 161-164 simultaneously. Because some of the community event content (e.g., sounds and/or lighting effects) are scheduled to be presented simultaneously on the wagering game machines 161-164, the community event content may be referred to as common content. In other examples, the community event content may also be referred to as simultaneous, or simultaneously presented, content.

One example of common content is a sound effect 141 that is scheduled to be played on the wagering game machines 16-164 at the same time during the community event. The sound effect 141, when played simultaneously by each of the wagering game machines 161-164, presents the exact same sound, resulting in a quadruple sound effect, or quadruple sound energy/field, from speakers for all four of the wagering game machines 161-164. The four sound fields amplify each other, resulting in an overall, or composite, volume level for the sound effect 141 that is louder than when the sound effect 141 is played alone. As mentioned previously, each of the wagering game machines 161-164 may have been preconfigured to play the sound effect 141 optimally for only a single wagering game machine. However, because a casino has grouped the wagering game machines 161-164 into a bank on the casino floor, the proximity of the wagering game machines 161-164 produce amplified sounds when the sound effect 141 is played from multiple ones of the wagering game machines 161-164 simultaneously.

The gaming effects controller 140, however, can detect a number of the wagering game machines 161-164 that are eligible, or scheduled, to the present the sound effect 141 (e.g., detect that all four of the wagering game machine 161-164 are scheduled to the play the sound effect 141). The gaming effect controller 140 can also detect characteristics of the wagering game machines 161-164 (e.g., via global positioning, by location sensors, etc.), or access stored data that indicates, characteristics of the wagering game machines 161-164. The characteristics may include positions (e.g., locations, orientations, coordinates, distances, etc.), amounts, types, etc. associated with the wagering game machines 161-164 or presentation devices associated with the wagering game machines 161-164. For instance, the gaming effect controller 140 can detect a distance (D1) between wagering game machines, a distance (D2) that spans eligible wagering game machines that are scheduled to play the sound effect 141 simultaneously, a distance (D3) to external presentation devices (e.g., overhead speakers 148 and 149 in signage 147, overhead emotive lighting associated with the bank and/or with each individual wagering game machine 161, 162, 163 and 164, etc). Another distance that the gaming effect controller 140 may take into consideration may include distances of gaps between eligible wagering game machines (e.g., the distance of a gap for the wagering game machines 162 and 163 if wagering game machines 162 and 163 were not eligible, but wagering game machines 161 and 164 were eligible). Another distance that the gaming effect controller 140 may also take into consideration may include the distance of speakers on the wagering game machines 161-164 to a sitting position for a player. The gaming effect controller 140 can also determine orientations of wagering game machines 161-164 or orientations of speakers attached to the wagering game machines 161-164 (e.g., determine an angle of direction that the wagering game machines 161-164 and project sound in relation to each other and in relation to other wagering game machines in the bank that are not eligible). The gaming effects controller 140 can automatically calculate, based on the number of wagering game machines and/or position measurements (e.g., distances D1, D2, and/or D3, directionality of sound projection, etc.), a comfortable volume level at which the wagering game machines 161-164 should play the sound effect 141 so that a combined volume level of the sound effect 141 does not amplify beyond, or exceed, a threshold volume level (e.g., a decibel level and/or presentation duration at which sound (1) becomes uncomfortable, (2) that is higher than a default volume level, (3) some combination, etc.), when played simultaneously. For example, the gaming effects controller 140 may attenuate sound so that the combined volume level of the four separately played instances of the sound effect 141 appears to sound, from a player's perspective at any one of the wagering game machines 161-164, as loud as a default volume level at which any one of the wagering game machines 161-164 are set to play the sound effect 141 non-simultaneously. The gaming effects controller 140 may also calculate a threshold lighting level (e.g., a luminosity level and/or presentation duration) for a lighting effect 131 simultaneously played on emotive lighting fixtures, the signage 147, external lighting devices associated with the wagering game machines 161-164, etc.

Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
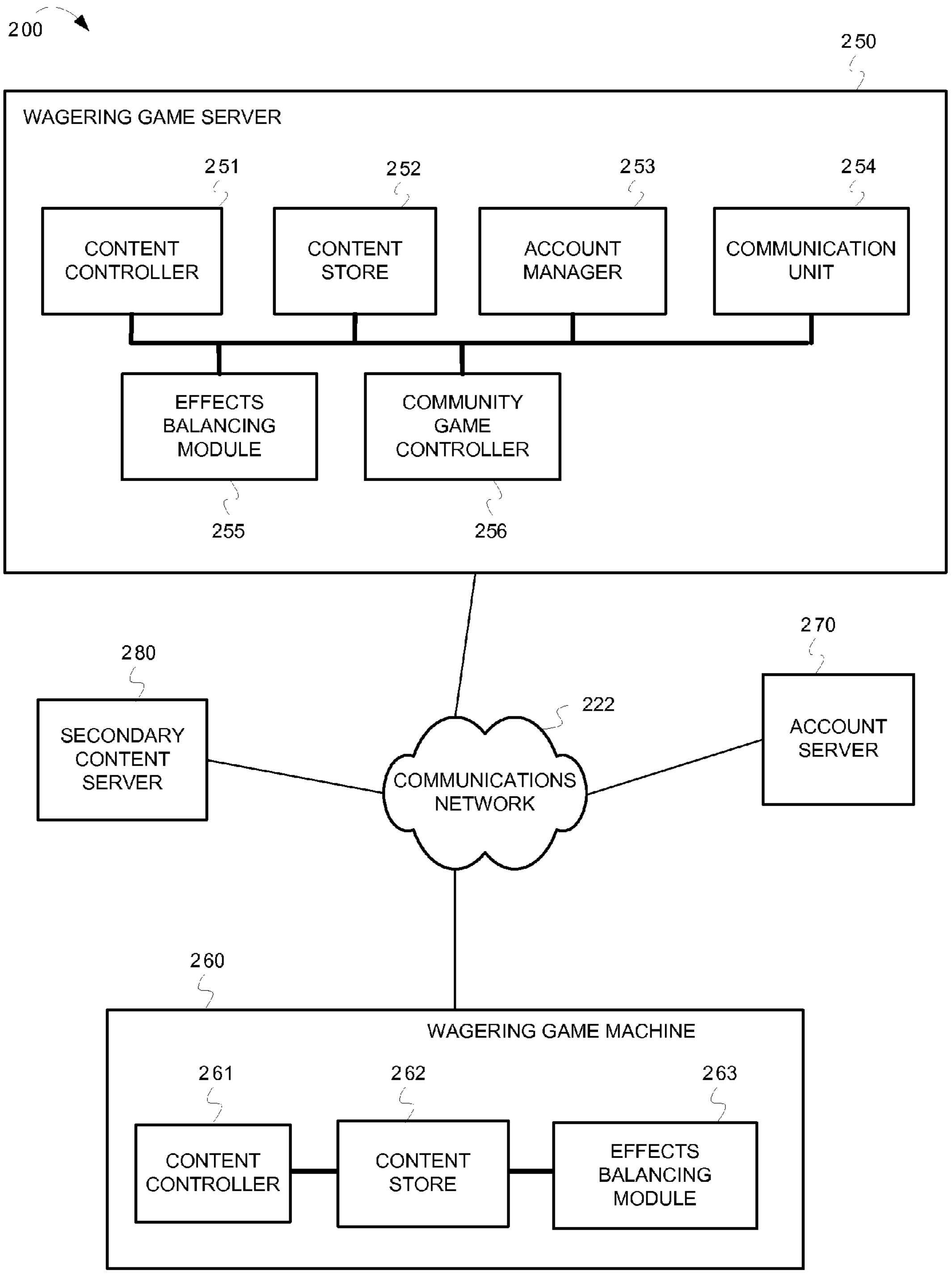
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networking networks. The account server 270 can store wagering game player account information, such as account settings (e.g., settings related to group games, settings related to social contacts, etc.), preferences (e.g., player preferences regarding volume settings, player preferences regarding award types, player preferences related to virtual assets, etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks. The wagering game server 250 can also include an effects balancing module 255 configured to balance lights, sounds, and other effects associated with community gaming events. The wagering game server 250 can also include a community game controller 256 configured to control community wagering games including community events associated with the community wagering games.

The wagering game system architecture 200 can also include a wagering game machine 260 configured to present wagering games and receive and transmit information to balance community wagering game audio. The wagering game machine 260 can include a content controller 261 configured to manage and control content and presentation of content on the wagering game machine 260. The wagering game machine 260 can also include a content store 262 configured to contain content to present on the wagering game machine 260. The wagering game machine 260 can also include an effects balancing module 263 configured to control effects balancing for community gaming events presented by, and for, wagering game machine groups.

The wagering game system architecture 200 can also include a secondary content server 280 configured to provide content and control information for secondary games and other secondary content available on a wagering game network (e.g., secondary wagering game content, promotions content, advertising content, player tracking content, web content, etc.). The secondary content server 280 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content server 280 can provide and control content for community games, including networked games, social games, competitive games, or any other game that multiple players can participate in at the same time. In some embodiments, the secondary content server 280 can control and present an online website that hosts wagering games. The secondary content server 280 can also be configured to present multiple wagering game applications on the wagering game machine 260 via a wagering game website, or other gaming-type venue accessible via the Internet. The secondary content server 280 can host an online wagering website and/or a social networking website. The secondary content server 280 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 280 can also be configured to provide secondary wagering games, community wagering games, community gaming events, etc. In some embodiments, the secondary content server 280 can also host social networking accounts, provide social networking content, control social networking communications, store associated social contacts, etc. The secondary content server 280 can also provide chat functionality for a social networking website, a chat application, or any other social networking communications mechanism. In some embodiments, the secondary content server 280 can utilize player data to determine marketing promotions that may be of interest to a player account. The secondary content server 280 can also analyze player data and generate analytics for players, group players into demographics, integrate with third party marketing services and devices, etc. The secondary content server 280 can also provide player data to third parties that can use the player data for marketing.

Each component shown in the wagering game system architecture 200 is shown as a separate and distinct element connected via a communications network 222. However, some functions performed by one component could be performed by other components. For example, the wagering game server 250 can also be configured to perform functions of the secondary content server 280, the account server 270, the effects balancing module 263, and other network elements and/or system devices. Furthermore, the components shown may all be contained in one device, but some, or all, may be included in, or performed by, multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., wagering game machine 260) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
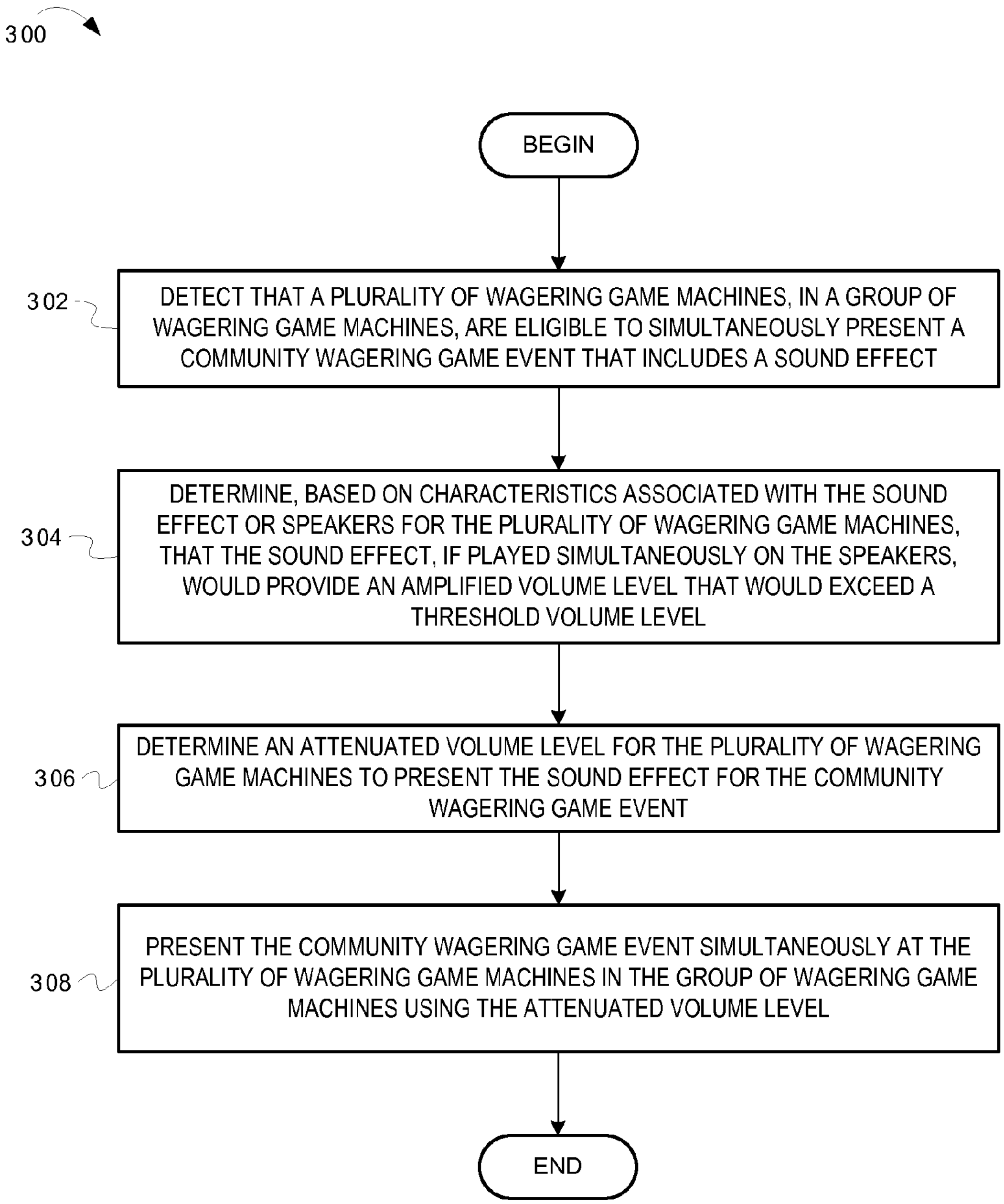
FIG. 3 is a flow diagram 300 illustrating balancing audio for community events at wagering game machine groups, according to some embodiments.

FIG. 3 is a flow diagram ("flow") 300 illustrating balancing audio for community events at wagering game machine groups, according to some embodiments. In FIG. 3, the flow 300 begins at processing block 302, where a wagering game system ("system") detects that a plurality of wagering game machines, in a group of wagering game machines, are eligible to simultaneously present a community wagering game event that includes a sound effect. In some embodiments, the system can determine that the wagering game machines are eligible to present the community wagering game event by determining that player accounts for players logged on to the wagering game machines are eligible to receive the community wagering game event. In some embodiments, the system can detect that player accounts have contributed a money amount during play of a primary wagering game to be eligible. In some embodiments, the group of wagering game machines is a grouping of machines that are close enough to each other that a presentation of community sounds, lighting, or other effects could amplify each other when played at the same time. Thus, one example of a wagering game machine group is a collection of wagering game machines grouped next to each other in a bank. Another example of a wagering game machine group is a collection of stations at an electronic wagering game table (e-table) designed to seat multiple wagering game players. A player can log in to each station, and each station may have one or more speakers, light fixtures, etc. assigned to it. Each station may present separate wagering games and community wagering games, and therefore, may present simultaneously effects for a community wagering game event, potentially resulting in amplified, distorted, or overly distracting sound effects, light effects, etc. Each station at the e-table is considered a wagering game machine, even though the e-table may have a common cabinet or casing. In some embodiments, the system can detect that a group of presentation devices external to wagering game machines are grouped together, and are eligible to present effects for the community wagering game event. The group of presentation devices includes grouped sound or light producing elements associated with the wagering game machines. The group of presentation devices can be separate (i.e., not attached to) cabinets or computing elements of the wagering game machines. In other words, the sound or light producing elements of the wagering game machines, when grouped together, are what create the community sounds and/or lights. As an example, cabinets of wagering game machines may be spread apart to certain distances, however, external speakers for each machine may be grouped together such that sound fields produced by the speakers would combine together in the air and produce an amplified sound when played simultaneously. Thus, the wagering game machines are eligible to present the community wagering game event, and the positions of the cabinets of the wagering game machines may be positioned far enough from each other, but the external speakers can produce amplified sound effects for the community wagering game event.

The flow 300 continues at processing block 304, where the system determines, based on characteristics associated with the sound effect or speakers associated with the plurality of wagering game machines, that the sound effect, if played simultaneously on the speakers, would provide an amplified volume level that would exceed a threshold volume level. The threshold volume level is a metric, or indicator value, that indicates an undesired amplified sound level (e.g., a decibel level at which sound would sound uncomfortably loud from a given vantage point at or near the group of wagering game machines). Examples of characteristics associated with the speakers may include physical locations of the speakers, physical characteristics of the speakers, orientation of the speakers, directionality of the sound effect from the speakers, placement of the speakers on the plurality of the wagering game machines, a number of the speakers, a type of the speakers, etc. Examples of characteristics associated with the sound effect may include a frequency of sound for the sound effect, a programmed volume level or setting for the sound effect, a duration for the sound effect, a degree of abruptness at which the sound effect is presented, a dissonance of the sound effect, a number of repetitions of the sound effect, a type of the sound effect, etc. The system determines that if the sound effect for the community wagering game event were to play simultaneously, at their default volume levels, on the speakers of the wagering game machines, and because the sound is common (i.e., sound signals are the same frequency for all speakers), the acoustic energy of the sound effect from the multiple speakers would combine in the air and amplify each other beyond a specific or threshold volume level. As more players play, and as more wagering game machines play the community event sound effect, the community sounds, or common audio fields, of the community event sound effect add to each other (e.g., magnify each other). In other words, the same, or common, sounds occur at the speakers for each wagering game machine, and, because the same sound occurs at each speaker, at the same time, the sound intensifies. Audio frequencies played at the same time amplify each other causing the sound to appear too loud for comfort.

In some embodiments, the system can determine a threshold volume level based on settings indicated by a player account logged in via a wagering game machine and/or a setting indicated by a casino account.

In some embodiments, the system may determine that at least one portion of the sound effect may be amplified even though other portions of the sound effect may not be amplified. For example, some sound effects ramp up, or crescendo, while being played toward a maximum volume level that has been programmed into the soundtrack for the sound effect.

In some embodiments, the system can determine a number of the plurality of wagering game machines that are eligible to present the community wagering game event, and use the number in determining a number of sound fields that will combine together. The system can determine that an amount of amplification would be proportional to the number of the sound fields.

In some embodiments, the system can refer to a stored listing or table of volume levels for the threshold volume level. The stored listing or table can indicate an upper range of comfortable sound levels (e.g., as indicated by a casino operator) that a casino would prefer for their patrons for a given time period of exposure. In other words, the listing or table may include an upper range of 80 db, for a period of 3 seconds, an upper range of 75 db for 10 seconds, and so forth. Thus, a casino operator can set more than one threshold volume level. Each threshold volume level could depend, however, on how long a simultaneously played sound effect would be played.

Some sounds may exceed a specific sound level, but only for a short period of time. Thus, the system may determine that even though the simultaneously presented sound would result in an amplified sound level, if the sound level was played for only a short period of time (e.g., less than a time exposure), then the system may refrain from attenuating sounds. In other embodiments, a casino operator or administrative user can utilize other lists or tables that are more or less restrictive than lists set by other casino operators. The system can provide a tool, or user interface, that a casino operator or administrative user can use to modify the threshold values and/or to load profiles related to (1) sound levels produced by speakers (e.g., a "soft" profile, a "loud" profile), (2) times or periods of time for gaming activity in the casino (e.g., a "busy" time or a "slow" time), (3) promotional or marketing campaigns, (4) seasonal, or holiday periods, or any other type, theme, etc.

In some embodiments, the system can determine characteristics of speakers by measuring, or determining orientations (e.g., directions at which machines and speakers on wagering game machines are facing each other) and/or distances between speakers. In some embodiments, each wagering game machine includes a location unit (e.g., see location unit 538 in FIG. 5). The location unit can provide a signal that identifies, or specifies, the location of the wagering game machine on a casino floor. In some embodiments, the system can detect and/or measure positions (e.g., distances, orientations, dimensions, etc.) before or after wagering game machines are placed on the floor. Some wagering game machines can send signals to a position tracker (e.g., global positioning satellite tracking devices, radio frequency tracking devices, orientation tracking devices, etc.). The position tracker may be part of an effects balancing module (e.g., see effects balancing module 255 in FIG. 2), that may included in a wagering game server, or other computer devices, that tracks positions. The system can also have access to a casino layout that specifies dimensions and coordinates of a casino floor. The system can correlate locations of wagering game machines to coordinates on the floor layout, and then calculate distances between wagering game machines or speakers associated with wagering game machines. In some embodiments, the system can store position values and use the position values while computing proper volume balancing. In some embodiments, the system can automatically adapt for slight differences in positions of wagering game machines (e.g., detect and adapt to banks that may bend into circles or other shapes instead of only being a straight line or row of wagering game machines). For example, a bank of machines that are bent into a circular shape may have less audio sound amplification as sound waves may radially move away from wagering game machines speakers instead of bleeding over to neighboring machines. Further, the system can detect distances from speakers to chairs where the players would be seated at a wagering game machine. For example, in some embodiments, a chair may be a foot away from the speakers of a wagering game machine, but other embodiments may have chairs that are several feet away from the speakers. Thus, the system measures the threshold volume level as it would sound, for the amplified, simultaneously presented sound sounds, at the ears of one or more of the players at the group of wagering game machines, and/or for participants situated close to the group of wagering game machines.

The flow 300 continues at processing block 306, where the system determines an attenuated volume level for the plurality of wagering game machines in the group of wagering game machines to present the sound effect for the community wagering game event. In some embodiments, the system can simulate and determine an attenuated volume level by calculating an anticipated upper, or maximum, volume level that would occur for a given sound effect(s) (e.g., for a loudest sound effect programmed for a community event, for an average sound level of the community event, etc.) if played simultaneously on the speakers. The system can compare the upper volume level against the threshold volume level. If the upper volume level meets and/or exceeds the threshold volume level, the system can then set a lowered volume level, or attenuated volume level, for the simultaneously played community sound effect based on the comparison. In other words, the system can determine that the upper volume level would amplify beyond the threshold volume level to be too uncomfortable for players situated at the wagering game machines, or rather at speakers associated with the wagering game machines.

In some embodiments, the system may be configured to present some sounds louder, or more accented, than other sounds made by others of the wagering game machines in the group (i.e., for other players who are not participating in the community wagering game event), but still attenuate the simultaneously presented sounds of the community wagering game event if the sounds are too loud for comfort. In some embodiments, the system can emphasize the simultaneously presented sounds based on a number of players in the group of wagering game machines.

In some embodiments, the simultaneously presented sounds may be for music, sound effects, and speech that are common to wagering game machines eligible for the community wagering game event. However, only some types of the simultaneously presented sounds may actually be loud enough to become too loud or uncomfortable. The system can select which of the sound types would potentially become too loud and only attenuate those types of sounds from a sound track or sound script. For example, some of the different types of simultaneously presented sounds may have default sound levels that are different. For instance, a background music volume in a community wagering game may be set at one sound level by default, but a voice volume may be set at a different sound level by default, which is higher than the background music volume level. As a result, the system can attenuate only the voice volume level and not the background music level, or attenuate the background music volume level to one degree and the voice volume level to another degree (e.g., attenuate voice volume by 10% but only reduce background music sounds by 5%, depending on the default volume levels at which the different types of sounds are set).

The system can further detect variable events within a type. For instance, a game character, such as an opponent or proponent character, may interact with only a portion of players that are playing a community wagering game. The game character may only speak something to the portion of the players. Thus, only some of the players experience the sound effect made by the encounter with the common game character. The system, therefore, can attenuate the voice sound for the encountered character for the portion of players (i.e., attenuate at speakers associated with wagering game machines at which the portion of the players are situated), while, at the same time, not attenuate other sounds associated with the community wagering game. The system, therefore, can be selective with the sounds it attenuates and may not have to attenuate an entire sound track just to avoid presenting potentially loud and uncomfortable sounds that only occur occasionally or for certain types of sound effects or for certain isolated events shared by a portion of the eligible players/wagering game machines.

In some embodiments, the system can attenuate simultaneously presented sounds by modifying a default sound volume level in a script with sound settings for a soundtrack to be the attenuated volume level, then playing the sounds for the script at the plurality of wagering game machine using the attenuated volume level. The scripts may have different volume levels, panning levels, balance levels, etc. for certain types of sounds. Thus, the system can modify default volume levels in scripts for only certain types of sounds. The system can also modify other settings in the script, such as modifying balance settings to shift sound to certain speakers instead of, or in addition to, modifying volume settings. The shifted sound may direct sounds in different directions, potentially preventing unwanted sound amplifications.

In some embodiments, the system can modify an overall volume level for a wagering game machine set at the wagering game machine, such as a default volume level set in a configuration setting or file for the wagering game machine. In other words, the system can determine a first volume level at which the wagering game machine is set to play audio as a default, and attenuate the first volume level sound to a second volume level lower than the first volume level.

The flow 300 continues at processing block 308, where the system presents the community wagering game event simultaneously at the plurality of wagering game machines in the group of wagering game machines using the attenuated volume level. In some embodiments, the system includes a gaming effects controller (e.g., gaming effectors controller 140 in FIG. 1) or a server (e.g., wagering game server 150 in FIG. 1) that balances volume levels for sound effects for community gaming events in wagering game machine groups. The gaming effects controller (e.g., a bank controller) can provide sound files to a wagering game machine or provide instructions to play sound files already store on the wagering game machine. The wagering game machine can receive the instructions to play the sound files associated with a community wagering game event. Thus, in some embodiments, the system can provide the content or provide instructions to play the content and the wagering game machine actually plays the content using its hardware (e.g., speakers, lights, displays, sound cards, etc.). In some embodiments, an effects balancing module, processors, bank controllers, or other elements incorporate into a wagering game machine can control sound balancing. A community wagering game server can communicate with other components that control sound balancing. The community wagering game server can provide instructions to a gaming effects controller, for example, that the community wagering game event is scheduled to be played on the plurality of wagering game machines. The gaming effects controller can thus modify volume settings and attenuate volume levels so that simultaneously presented sounds are not amplified, or overly amplified, according to threshold volume levels.

Additional Example Embodiments

According to some embodiments, a wagering game system ("system") can provide various example devices, operations, etc., to balance community wagering game audio. The following non-exhaustive list enumerates some possible embodiments.

Figure 4:
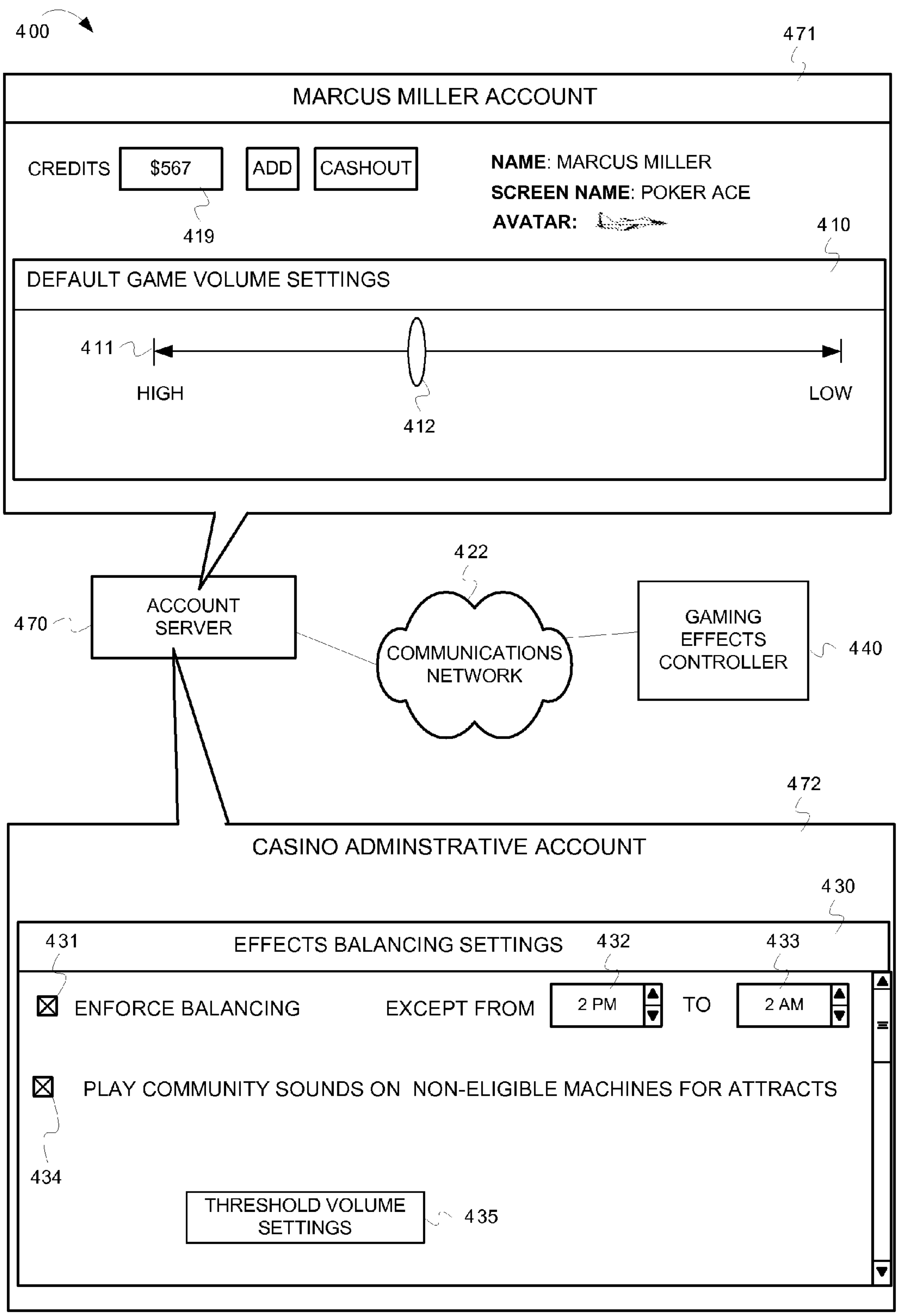
FIG. 4 is an illustration of a wagering game system 400, according to some embodiments.

- In some embodiments, the system can balance presentation of lights, scents, vibrations, or other media for presenting community events. Common lighting events can amplify each other when played simultaneously. For example, if each cabinet in a group of wagering game machines flashes a bright flashing light at the same time, then the combination of bright flashing lights in the group of wagering game machines can become too bright and overbearing. The system can modify (e.g., attenuate) light intensity values based on a threshold luminosity value so that the multiple lighting effects overly amplify each other. In some embodiments, the system can shift the timing of light presentations so that the light presentation from lighting devices is staggered, or does not overlap in timing, thus minimizing light presentations that are adjacent to, or within visual range, of each other. Some embodiments may include modifying directionality for lighting devices, such as modifying a default direction at which lighting fixtures are pointed so that light signals, rays, etc. are directed away from an observer's eyes. Some embodiments can modify the pattern or lighting effects. For example, lights may, by default, be set to remain on for a duration of a light effect. However, the system can instead turn lights on and off (e.g., cause the lights to blink or strobe) instead of reducing luminosity levels so that light effect presents for an originally scheduled duration, but with a different pattern that minimizes exposure to an observer's eyes to the amplified light effect that would occurs because of the simultaneous presentation.
- In some embodiments, the system can attenuate sounds, lighting, etc., based on user preferences. For example, the system can reduce volume levels based on, or relative to, a player's preference for volume settings stored in a player account. FIG. 4 illustrates an example. In FIG. 4, a wagering game system ("system") 400 includes a gaming effects controller 440 connected to an account server 470 via a communications network 422. The account server 470 can host a player's wagering game account (e.g., the player account 471 belonging to the player "Marcus Miller"). The player account 471 can include information relevant to a wagering game account, including a credit balance 419, an avatar, wagering game settings, etc. In some embodiments, the account may include a default volume setting 410 set by the player (e.g., set by Marcus Miller). The default volume setting 410 indicates a volume level that the player prefers for gaming content to be played at when the player logs in to a wagering game machine. The default volume setting 410 may include a range or scale 411 of sound and a setting control 412. A player can use the setting control 412 to set a preferred volume level for the player account 417 on a range of volumes (e.g., from high, or loud, to low, or soft). For example, a first player account may have a loud setting and a second player account, may have a medium or lower volume setting. When a first player, for the first player account, logs in to a first wagering game machine and a second player, for the second player account, logs in to a second wagering game machine, the system can present sounds on the first wagering game machine loudly and the system can present sounds on the second wagering game machine softly. If the system needs to attenuate sound effects that may potentially amplify each other when played simultaneously on speakers for the first wagering game machine and the second wagering game machine, the system can reduce the default volume levels (e.g., programmed volume levels) for each of the first wagering game machine and the second wagering game machine proportionate to the preferred volume settings set for the first player account and the second player account. In some embodiments, casinos may also have preferences regarding balancing sound or light intensity. For example, a casino operator may indicate, via a preference setting, that at times when casino activity is slow, the simultaneously presented effects should be attenuated. However, during a peak time, or busy time, the casino may have indicated, via another preference setting, to allow simultaneously presented effects to be presented without modification, even if the effects to amplify each other, to attract attention of other players in the casino to the bank. For instance, in FIG. 4, a casino administrative account 472 can include effects balancing settings 430. The effects balancing settings 430 may include a control 431 to enforce balancing (e.g., to turn on, or enable, balancing effects). The effects balancing settings 430 may also include exceptions settings, such as time controls 432, 433 that a casino administrative user can set to a time period during which effects balancing is not enforced. The effects balancing settings 430 may also include a control 434 to force sound effects for community wagering game events to play at wagering game machines that would not normally be eligible to present a community wagering game event. The control 434 can have conditions related to when to force the sound effects for the community wagering game events to play at the non-eligible wagering game machines (e.g., for attracts, or attraction advertisement shows). The effects balancing settings 430 can also include settings 435 that a casino administrative user can use to set threshold volume levels.

In some embodiments, the system can attenuate effects based on bank configurations and player positions. For instance, the system may not attenuate sounds if a player is at one end of a bank and another player is at another end of a bank without any other players in between. The machines will be far enough apart from each other that the sounds will not become uncomfortable. Thus, the system detects where players are logged in, or seated, at the bank of machines and makes a determination based on where the players are situated.

In some embodiments, the system can attenuate effects based on player eligibility to receive events and based on a player's position. For example, the system can determine when to attenuate simultaneously presented sounds based on eligibility of the players situated at the bank of wagering game machines to receive the community event. For instance, in some embodiments, a player is eligible to experience a community gaming event if the player has performed a specific activity during their primary wagering game. For example, a player can add a specific amount of a bet, (e.g., sometimes called a "buy in" amount or a "contribution" amount) toward a progressive or other type of "big event" that may payout a bonus or a jackpot. Other players at the bank playing the same primary wagering game, however, may not pay the buy-in or contribution amounts and therefore may not be eligible to experience the community event. However, the bank may include players seated at all or most of the wagering game machines. The players at the far end of the bank may both be eligible to receive the community event. Even though the distance between the two machines at the bank would not cause the volume levels to become too loud for any given player at the bank, the system may still attenuate the sounds so that the other players at the bank who were not eligible are not annoyed at hearing an increased sound level for a jackpot.

In some embodiments, the system can cause or allow amplification of effects based on player eligibility and/or player positions. For instance, if players who are eligible to receive a presentation of a community wagering game event and are far enough away from each other at a bank that the system would not need to attenuate simultaneously presented sounds, the system may instead decide to increase sound levels so that other players who were not eligible to participate may become convinced to begin making the contribution or buy-in.

In some embodiments, the system can set default sound levels at lower than normal levels (e.g., either programmed by a sound engineer to be lower than optimal or set by the system as a default lower volume level). The lower level may be based on an assumption that multiple players are at a bank of machines. The system, therefore, can detect when fewer players than anticipated are situated at the bank and can increase or amplify sound levels based on the fewer amounts of players at the bank.

In some embodiments, the system can attenuate effects based on additional sources of sound or light other than a wagering game machine group. The additional sources may present simultaneously presented sounds, lights, etc., at the same time the wagering game machine resources present the simultaneously presented sounds, lights, etc. For instance, speakers and/or lights that are external to wagering game machines (e.g., overhead, in the background, on signage, etc.) may play the sounds and light effects for the community gaming event. The system can treat the external speakers and/or lights as an additional source and attenuate the sounds as needed to prevent excessive noise or light. In some embodiments, the system can determine the configuration or orientation of a bank in relation to the external speakers and/or lights. For example, the system can the system can determine a degree of sound energy or sound fields that the players at a wagering game machine group will possibly receive from the external speakers before determining an attenuated volume level.

In some embodiments, the system can dynamically adjust effects levels during a community wagering game event. In some embodiments, during a community gaming event, sound levels may be attenuated at the start of the community gaming event a specific amount (e.g., two decibel units) based on a number of players at the bank, their positions, and/or their eligibility. However, during the community gaming event, some sound levels may grow even louder (e.g., build-ups during the community gaming event) in ways that the system may not have compensated for (e.g., players perform activities that lead to gaming events with loud or ramped up additional sounds). As a result, the system can dynamically determine that the previously unanticipated sounds should be attenuated further than an originally determined attenuated volume level (e.g., attenuate an additional two decibel units during the loud or ramped up additional sounds). The system can attenuate dynamically causing a sound effect to modify in relationship to its soundtrack in a fluid way. For instance, the system can determine that a sound effect may rise in volume over a period of five seconds, during a buildup of volume ("buildup"), but will cause amplified sounds to reach uncomfortable levels during only the last two seconds of the buildup. However, dynamically changing the sound during the last two seconds of the buildup would cause an abrupt distortion in the volume of the sound during the build-up, ruining the buildup sound effect. Thus, the system can dynamically determine a sound range for the buildup to experience that would not exceed uncomfortable sound levels and allow the build-up in volume to increase gradually and fluidly within that range without causing abrupt dynamic attenuation modifications. In some embodiments, the system can refrain from dynamically modifying volume levels even if the volume levels increase to a threshold volume level as long as the threshold volume level does not extend beyond a certain period of time (e.g., the system determines that a build-up volume level will not exceed the threshold volume level for more than three seconds and thus does nothing to dynamically attenuate sounds).

In some embodiments, the system can dynamically accentuate sounds. The system can dynamically accentuate sounds that may have become too low based on the attenuation. In other embodiments, the system may play the community event on all machines at a bank to attract players. For example, the system may instruct an entire bank to play the community gaming event sounds at all machines at the bank, even if only a few players are logged on at the bank, to draw other potential players to the machines for a very special event (e.g., when a jackpot is about to hit and the casino wants to draw many potential players to the bank).

Additional Example Operating Environments

This section describes example operating environments, systems and networks, and presents structural aspects of some embodiments.

Wagering Game Machine Architecture

Figure 5:
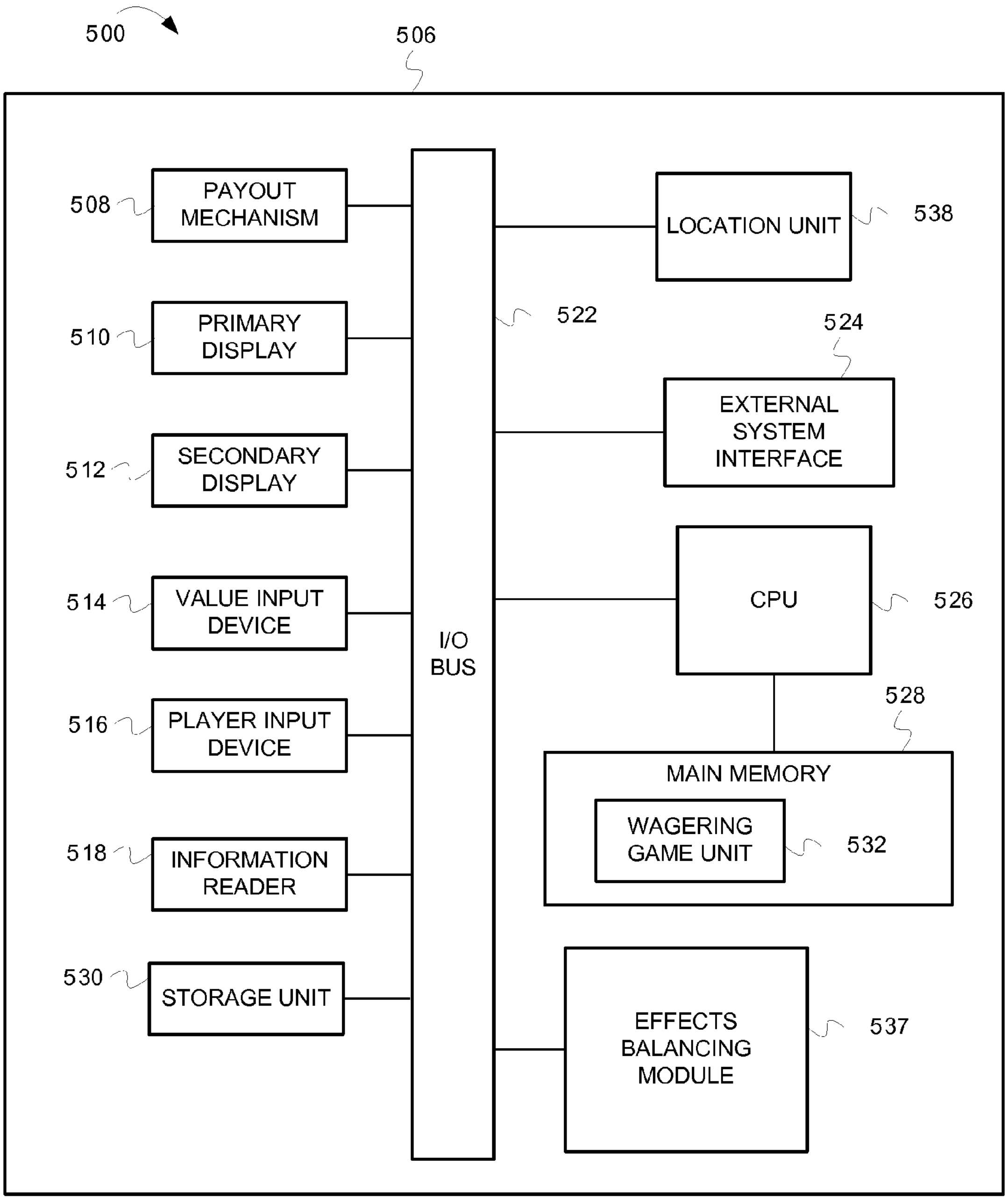
FIG. 5 is an illustration of a wagering game machine architecture 500, according to some embodiments.

FIG. 5 is a conceptual diagram that illustrates an example of a wagering game machine architecture 500, according to some embodiments. In FIG. 5, the wagering game machine architecture 500 includes a wagering game machine 506, which includes a central processing unit (CPU) 526 connected to main memory 528. The CPU 526 can include any suitable processor, such as an Intel® Pentium processor, Intel® Core 2 Duo processor, AMD Opteron™ processor, or UltraSPARC processor. The main memory 528 includes a wagering game unit 532. In some embodiments, the wagering game unit 532 can present wagering games, such as video poker, video black jack, video slots, video lottery, reel slots, etc., in whole or part.

The CPU 526 is also connected to an input/output ("I/O") bus 522, which can include any suitable bus technologies, such as an AGTL+frontside bus and a PCI backside bus. The I/O bus 522 is connected to a payout mechanism 508, primary display 510, secondary display 512, value input device 514, player input device 516, information reader 518, and storage unit 530. The player input device 516 can include the value input device 514 to the extent the player input device 516 is used to place wagers. The I/O bus 522 is also connected to an external system interface 524, which is connected to external systems (e.g., wagering game networks). The external system interface 524 can include logic for exchanging information over wired and wireless networks (e.g., 802.11g transceiver, Bluetooth transceiver, Ethernet transceiver, etc.)

The I/O bus 522 is also connected to a location unit 538. The location unit 538 can create player information that indicates the wagering game machine's location/movements in a casino. In some embodiments, the location unit 538 includes a global positioning system (GPS) receiver that can determine the wagering game machine's location using GPS satellites. In other embodiments, the location unit 538 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 5, in some embodiments, the location unit 538 is not connected to the I/O bus 522.

In some embodiments, the wagering game machine 506 can include additional peripheral devices and/or more than one of each component shown in FIG. 5. For example, in some embodiments, the wagering game machine 506 can include multiple external system interfaces 524 and/or multiple CPUs 526. In some embodiments, any of the components can be integrated or subdivided.

In some embodiments, the wagering game machine 506 includes an effects balancing module 537. The effects balancing module 537 can process communications, commands, or other information, where the processing can balance community wagering game audio, lighting, and other effects.

Furthermore, any component of the wagering game machine 506 can include hardware, firmware, and/or machine-readable storage media including instructions for performing the operations described herein.

Wagering Game Machine

Figure 6:
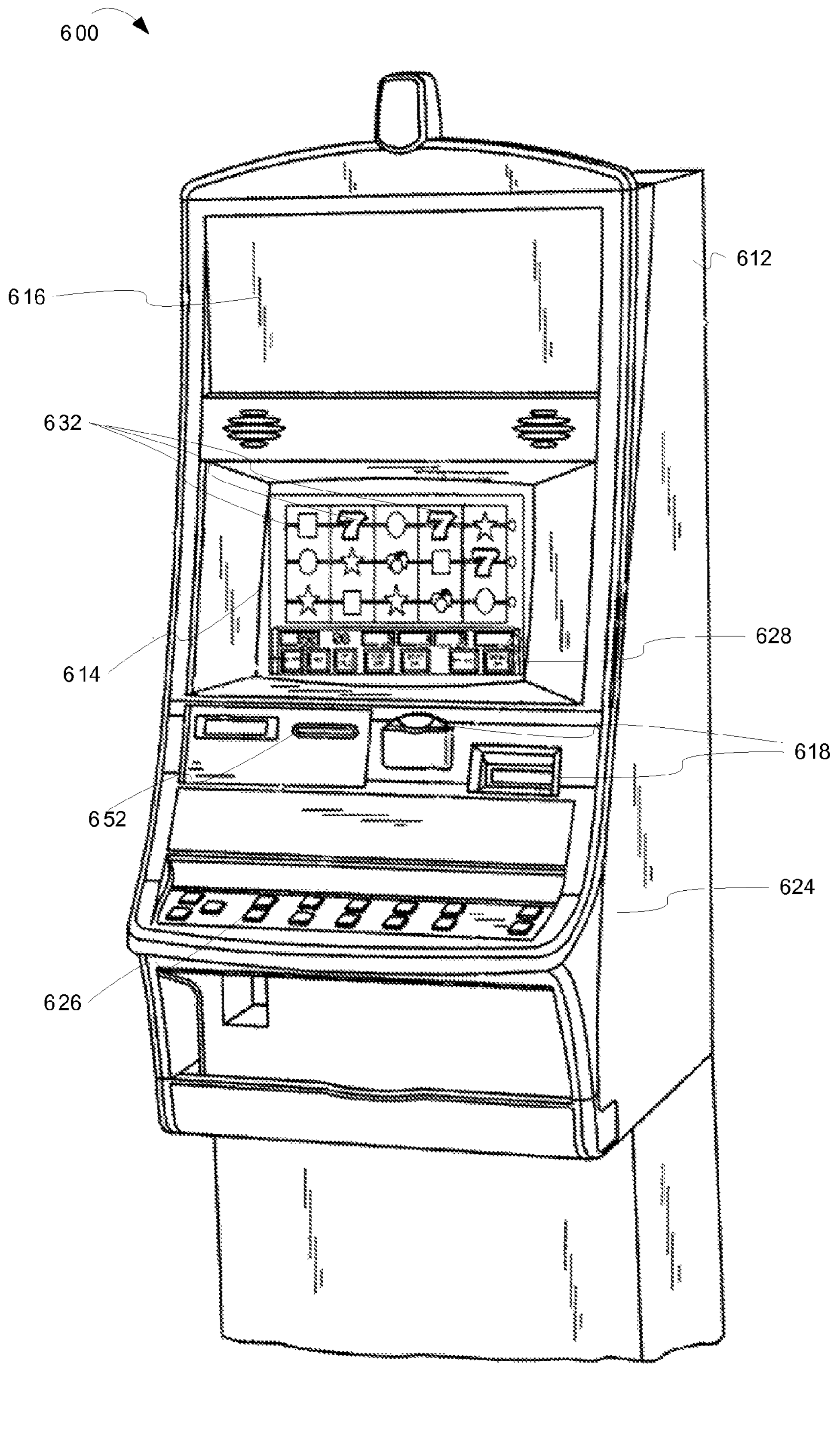
FIG. 6 is an illustration of a wagering game machine 600, according to some embodiments.

FIG. 6 is a conceptual diagram that illustrates an example of a wagering game machine 600, according to some embodiments. Referring to FIG. 6, the wagering game machine 600 can be used in gaming establishments, such as casinos. According to some embodiments, the wagering game machine 600 can be any type of wagering game machine and can have varying structures and methods of operation. For example, the wagering game machine 600 can be an electromechanical wagering game machine configured to play mechanical slots, or it can be an electronic wagering game machine configured to play video casino games, such as blackjack, slots, keno, poker, blackjack, roulette, etc.

The wagering game machine 600 comprises a housing 612 and includes input devices, including value input devices 618 and a player input device 624. For output, the wagering game machine 600 includes a primary display 614 for displaying information about a basic wagering game. The primary display 614 can also display information about a bonus wagering game and a progressive wagering game. The wagering game machine 600 also includes a secondary display 616 for displaying wagering game events, wagering game outcomes, and/or signage information. While some components of the wagering game machine 600 are described herein, numerous other elements can exist and can be used in any number or combination to create varying forms of the wagering game machine 600.

The value input devices 618 can take any suitable form and can be located on the front of the housing 612. The value input devices 618 can receive currency and/or credits inserted by a player. The value input devices 618 can include coin acceptors for receiving coin currency and bill acceptors for receiving paper currency. Furthermore, the value input devices 618 can include ticket readers or barcode scanners for reading information stored on vouchers, cards, or other tangible portable storage devices. The vouchers or cards can authorize access to central accounts, which can transfer money to the wagering game machine 600.

The player input device 624 comprises a plurality of push buttons on a button panel 626 for operating the wagering game machine 600. In addition, or alternatively, the player input device 624 can comprise a touch screen 628 mounted over the primary display 614 and/or secondary display 616.

The various components of the wagering game machine 600 can be connected directly to, or contained within, the housing 612. Alternatively, some of the wagering game machine's components can be located outside of the housing 612, while being communicatively coupled with the wagering game machine 600 using any suitable wired or wireless communication technology.

The operation of the basic wagering game can be displayed to the player on the primary display 614. The primary display 614 can also display a bonus game associated with the basic wagering game. The primary display 614 can include a cathode ray tube (CRT), a high resolution liquid crystal display (LCD), a plasma display, light emitting diodes (LEDs), or any other type of display suitable for use in the wagering game machine 600. Alternatively, the primary display 614 can include a number of mechanical reels to display the outcome. In FIG. 6, the wagering game machine 600 is an "upright" version in which the primary display 614 is oriented vertically relative to the player. Alternatively, the wagering game machine can be a "slant-top" version in which the primary display 614 is slanted at about a thirty-degree angle toward the player of the wagering game machine 600. In yet another embodiment, the wagering game machine 600 can exhibit any suitable form factor, such as a free standing model, bar top model, mobile handheld model, or workstation console model.

A player begins playing a basic wagering game by making a wager via the value input device 618. The player can initiate play by using the player input device's buttons or touch screen 628. The basic game can include arranging a plurality of symbols 632 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 600 can also include an information reader 652, which can include a card reader, ticket reader, bar code scanner, RFID transceiver, or computer readable storage medium interface. In some embodiments, the information reader 652 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:

detecting that a plurality of wagering game machines are eligible to simultaneously present a plurality of instances of a sound effect;

determining, by one or more processors, that, based on distances between the plurality of wagering game machines and a player position of a wagering game machine of the plurality of wagering game machines, a presentation of the plurality of instances of the sound effect would have an amplified volume when played simultaneously at a default volume level from one or more speakers of each of the plurality of wagering game machines; and modifying by the one or more processors a default volume level at which the plurality of instances of the sound effect is configured to play, in response to the determining that the presentation of the plurality of instances of the sound effect would have an amplified volume when played simultaneously, wherein modifying the default volume level includes modifying the default volume level to a degree proportional to a number of the plurality of wagering game machines.

2. The computer-implemented method of claim 1 wherein the modifying the default volume level at which the plurality of instances of the sound effect is configured to play comprises:

determining that the amplified volume would exceed a threshold volume level; and decreasing the default volume level to remain below the threshold volume level.

3. The computer-implemented method of claim 1 further comprising:

detecting a volume preference associated with one of the plurality of the wagering game machines; and modifying the default volume level for the one of the plurality of the wagering game machines proportional to the volume preference.

4. The computer-implemented method of claim 1 further comprising:

detecting an activity associated with a wagering game session for one of the plurality of wagering game machines; and making the one of the plurality of the wagering game machines eligible to present one of the plurality of instances of the sound effect based on the detecting of the activity.

5. The computer-implemented method of claim 1 further comprising:

determining that only a portion of the presentation of the plurality of instances of the sound effect would exceed a maximum volume level when played simultaneously; and attenuating the default volume level for only the presentation of the plurality of instances of the sound effect.

6. One or more non-transitory machine-readable storage media having instructions stored thereon, which when executed by a set of one or more processors causes the set of one or more processors to perform operations comprising:

detecting that a plurality of wagering game machines are eligible to play a sound effect during a community wagering game;

detecting that the sound effect is scheduled to play simultaneously on speakers controlled by the plurality of wagering game machines;

determining, based on at least one characteristic associated with one or more of the speakers and the sound effect, that the sound effect, if played simultaneously on the speakers, would provide a combined sound energy that would exceed a first volume level;

determining a second volume level at which the plurality of wagering game machines is configured, by default, to present audio from the speakers; and attenuating the second volume level so that the combined sound energy for the sound effect will not exceed the first volume level when the sound effect is played simultaneously on the speakers, wherein attenuating the second volume level includes attenuating the second volume level based, at least in part, on distances between the plurality of wagering game machines and a player position of a wagering game machine of the plurality of wagering game machines.

7. The one or more non-transitory machine-readable storage media of claim 6, said operations further comprising:

determining a duration for which the sound effect is scheduled to continuously play; and attenuating the second volume level based on the duration.

8. The one or more non-transitory machine-readable storage media of claim 6, wherein the speakers are attached to the plurality of wagering game machines, and wherein the at least one characteristic includes a distance between the speakers.

9. The one or more non-transitory machine-readable storage media of claim 6, said operations further comprising:

determining a volume preference setting associated with a player situated at one of the plurality of the wagering game machines; and attenuating the second volume level using the volume preference setting.

10. The one or more non-transitory machine-readable storage media of claim 6, wherein said operation of detecting that the plurality of the wagering game machines are eligible to play the sound effect during the community wagering game includes operations comprising:

detecting that the plurality of wagering game machines have received one or more monetary contributions from player accounts during one or more wagering game sessions; and determining, based on the monetary contributions made during the one or more wagering game sessions, that players at the plurality of wagering game machines are eligible to participate in an event for the community wagering game, wherein the sound effect is associated with the event.

11. The one or more non-transitory machine-readable storage media of claim 6, wherein said characteristics associated with the one or more of the speakers and the sound effect comprise one or more of physical locations of the speakers, physical properties of the speakers, orientation of the speakers, directionality of the sound effect from the speakers, placement of the speakers on the plurality of the wagering game machines, a number of the speakers, a frequency of sound for the sound effect, a programmed volume setting for the sound effect, a duration for the sound effect, a degree of abruptness at which the sound effect is presented, a dissonance of the sound effect, a number of repetitions of the sound effect, and a type of the sound effect.

12. A system comprising:

a server configured to provide content for a community wagering game event that occurs for a community wagering game; and a gaming effects controller configured to, via a processor, detect an occurrence of the community wagering gaming event, detect that a plurality of wagering game machines are eligible to simultaneously present the content for the community wagering game event on content presentation devices associated with the plurality of wagering game machines, wherein the content is configured to be presented using a default presentation setting that indicates a first degree of presentation from the content presentation devices, and wherein the content presentation devices are configured such that a simultaneous presentation of the content would exceed a second degree of presentation greater than the first degree of presentation, and modify the default presentation setting at which the content is configured to be presented on the content presentation devices, in response to the detecting that the plurality of wagering game machines are eligible to simultaneously present the content, so that the content presentation devices present the content to not exceed the second degree of presentation, wherein the default presentation setting is modified based, at least in part, on distances between the plurality of wagering game machines and a player position of one of the plurality of wagering game machines.

13. The system of claim 12, wherein the content is one or more of a sound effect and a light effect.

14. The system of claim 12, wherein the content presentation devices are external to the plurality of wagering game machines.

15. The system of claim 12, wherein the content presentation devices are within a given distance to each other such that if signals of a same frequency were to be produced at a same time by the content presentation devices, signals would combine and amplify each other.

16. An apparatus comprising:

a processor; and a gaming effects controller configured to, via the processor, detect that a plurality of wagering game machines, in a group of wagering game machines, are eligible to simultaneously present a community wagering game event that includes a sound effect, determine, based on a number of the plurality of wagering game machines, that the sound effect, if played simultaneously on speakers associated with the plurality of wagering game machines, would provide an amplified volume level for the sound effect that would exceed a threshold volume level, determine a default volume level at which the sound effect is configured to play on the speakers, wherein the default volume level is based, at least in part, on distances between the plurality of wagering game machines and a player position of one of the plurality of wagering game machines, and modify the default volume level to remain below the threshold volume level.

17. The apparatus of claim 16, wherein the group of wagering game machines comprises one or more of a bank of separate wagering game devices and stations at an electronic wagering game table.

18. The apparatus of claim 16, wherein the gaming effects controller is further configured to detect one or more sound scripts that indicate the default volume level associated with the sound effect, modify the one or more sound scripts with a modified volume level, and use the one or more sound scripts with the modified volume level.

19. The apparatus of claim 16, wherein the gaming effects controller is further configured to determine, during presentation of the sound effect, that an additional event occurs that affects the sound effect, and dynamically modifying the default volume level further to remain below the threshold volume level.

* * * * *